(12) United States Patent
Park et al.

(10) Patent No.: US 7,079,116 B2
(45) Date of Patent: Jul. 18, 2006

(54) METHOD OF PROCESSING DATA OF OPTICAL MOUSE

(75) Inventors: Keun-Woo Park, Seoul (KR); Jong-Sik Jeong, Seoul (KR); Kyoung-Joong Min, Yongin-si (KR); Kang-ju Kim, Jeollanam-do (KR); Byoung Won Hwang, Seoul (KR); Won-Tae Choi, Suwon-si (KR)

(73) Assignee: Samsung Electro-Mechanics Co., Ltd., Kyunggi-Do (KR)

( * ) Notice: Subject to any disclaimer, the term of this patent is extended or adjusted under 35 U.S.C. 154(b) by 393 days.

(21) Appl. No.: 10/414,689

(22) Filed: Apr. 16, 2003

(65) Prior Publication Data

US 2004/0100444 A1 May 27, 2004

(30) Foreign Application Priority Data

Nov. 22, 2002 (KR) ...................... 10-2002-0073213

(51) Int. Cl.
*G09G 5/08* (2006.01)
(52) U.S. Cl. ...................... 345/163; 345/156; 345/157; 345/166; 178/18.01; 178/18.09
(58) Field of Classification Search ................ 345/156, 345/157, 158, 163, 166, 851, 857, 858; 178/18.01, 178/18.09; 358/1.5, 1, 12, 1.12
See application file for complete search history.

(56) References Cited

U.S. PATENT DOCUMENTS

| | | | | |
|---|---|---|---|---|
| 4,631,400 A | * | 12/1986 | Tanner et al. ................ 250/221 |
| 5,598,187 A | * | 1/1997 | Ide et al. ..................... 345/158 |
| 6,128,108 A | * | 10/2000 | Teo .............................. 358/540 |
| 6,568,777 B1 | * | 5/2003 | Anderson et al. ............... 347/9 |
| 2002/0070277 A1 | * | 6/2002 | Hannigan ............... 235/462.45 |
| 2002/0175921 A1 | * | 11/2002 | Xu et al. ..................... 345/589 |
| 2004/0066372 A1 | * | 4/2004 | Park et al. .................. 345/163 |
| 2004/0091165 A1 | * | 5/2004 | Park et al. .................. 382/260 |
| 2004/0100444 A1 | * | 5/2004 | Park et al. .................. 345/166 |
| 2005/0190144 A1 | * | 9/2005 | Kong ......................... 345/156 |

FOREIGN PATENT DOCUMENTS

KR     1020000062130     10/2000

* cited by examiner

*Primary Examiner*—Bipin Shalwala
*Assistant Examiner*—Vincentg E. Kovalick
(74) *Attorney, Agent, or Firm*—Gottlieb Rackman & Reisman P.C.

(57) ABSTRACT

Disclosed herein is a method of processing data of an optical mouse. The method includes the steps of calculating a motion vector of the optical mouse through processing of digitally converted image pixel data in an Image Signal Processor (ISP) by sequentially overlapping a reference image of an n−1 th frame to a present image of an nth frame and determining a moving direction of the optical mouse using approximately equal parts in the reference and present images; and transmitting the calculated motion vector to a personal computer through an interface; wherein the ISP includes an X axis navigation engine for processing data on a reference image for the motion of an X axis direction among the processed image pixel data and a Y axis navigation engine for processing data on a reference image for the motion of a Y axis direction among the processed image pixel data.

13 Claims, 7 Drawing Sheets

METHOD OF PROCESSING DATA OF OPTICAL MOUSE

BACKGROUND OF THE INVENTION

1. Field of the Invention

The present invention relates generally to a method of processing image data of an optical mouse, and more particularly, to a method of processing image data of an optical mouse, which is capable of improving the detection of the two-dimensional motion of an optical mouse.

2. Description of the Prior Art

Figure 1:
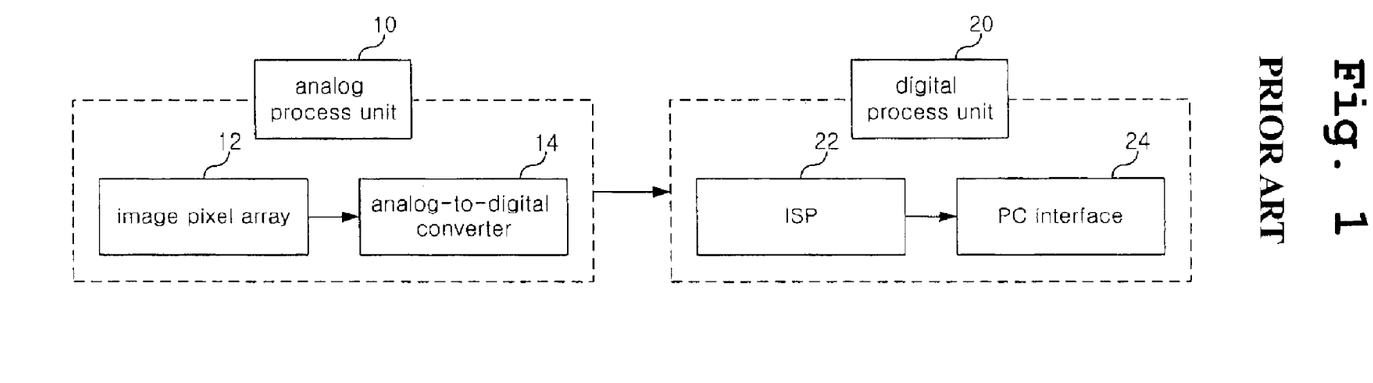
FIG. 1 is a block diagram showing the processing of image data of a general optical mouse.

FIG. 1 is a block diagram showing the processing of image data of a general optical mouse. As shown in FIG. 1, the data process block of the general optical mouse includes an analog process unit 10 that reads the image of a surface under the optical mouse in analog data and converts the analog data into digital data, and a digital process unit 20 that calculates and outputs a motion vector with respect to time using the digital data.

The analog process unit 10 includes an image pixel array 12 that generates an analog image according to the amount and intensity of light reflected by a surface under the optical mouse, and an Analog-to-Digital Converter (ADC) 14 that converts the analog data of the image pixel array 12 into the digital data.

Additionally, the digital process unit 20 includes an Image Signal Processor (ISP) 22 that calculates a motion vector by processing the digital data, and a Personal Computer (PC) interface 24 that receives data output from the image signal processor 22 and transmits data to the image signal processor 22 through data communication.

Figure 2:
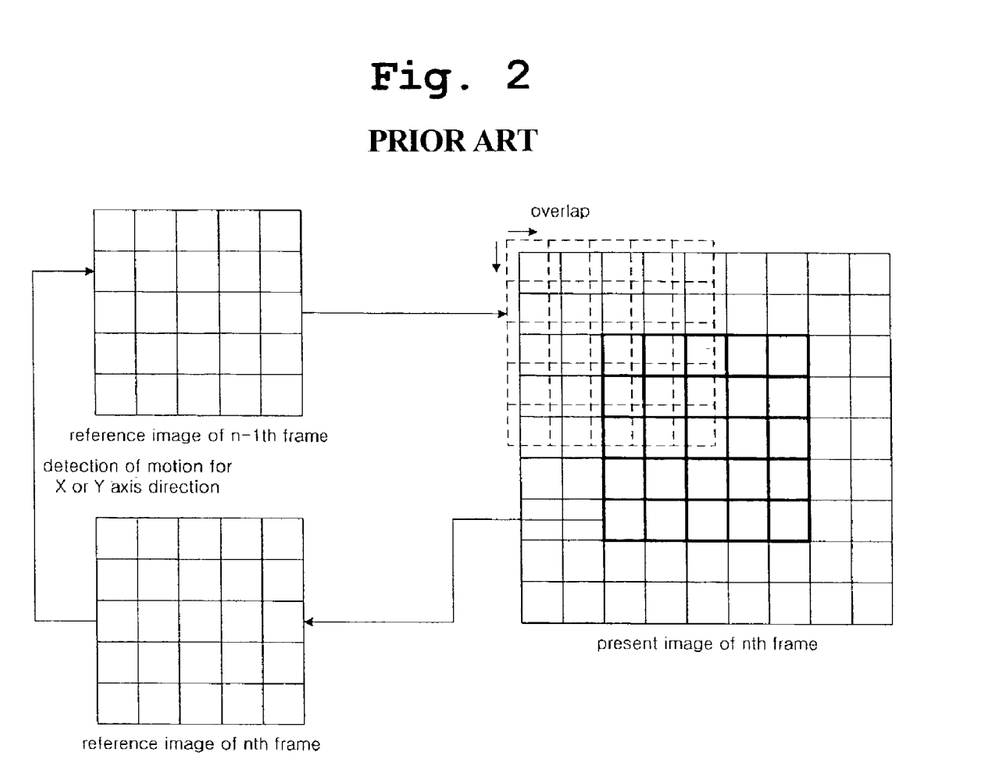
FIG. 2 is a schematic view illustrating a conventional method of processing image data of an optical mouse.

There is described an algorithm for processing image data of an optical mouse to calculate the motion vector of the optical mouse through the image signal processor 22 with reference to FIG. 2. FIG. 2 is a schematic view illustrating a conventional method of processing image data of an optical mouse.

To implement the algorithm, at least three memory spaces are needed to store pixel data. The memory spaces store the reference image of an n−1 th frame for an X axis and a Y axis, the present image of an nth frame for the X axis and the Y axis, and the reference image of the nth frame for the X axis and the Y axis.

First, the reference image of the n−1 th frame is selectively extracted from the total image of the n−1 th frame in order to find the motion of the optical mouse in the nth frame. The present image of the nth frame is the total image of the nth frame. Last, the reference image of the nth frame is selectively extracted from the present image of the nth frame and become a reference image to find the motion of the optical mouse in an n+1 th frame.

As described above, the moving direction of the motion vector is determined using most approximately equal parts of the reference image of the n−1 th frame and the present image of the nth frame while the reference image of the n−1 th frame is sequentially overlapped with the present image of the nth frame. The reference and present images should ideally coincide with each other by 100%, but the reference and present images does not actually coincide with each other by 100% due to the noise of the images and so on in terms of characteristics of an image sensor.

The motion of the optical mouse is found through repeated performance of the above-described process.

There are matters to be considered in the repeated performance of the process. For one, detection errors of one pixel or less always exist in the algorithm for calculating the motion vector of the optical mouse because the image sensor has a physical size. If the reference image of the n−1 th frame is updated to the reference image of the nth frame in every frame, the motion of the optical mouse cannot be detected when the optical mouse is slowly moved by one pixel or less. To solve this problem, if the reference image of the n−1 th frame is updated only when motion is detected instead of updating the reference image of the n−1 th frame in every frame, the detection errors can be minimized and the motion of the optical mouse can be detected for the case where the optical mouse is slowly moved by one pixel or less.

Figure 3:
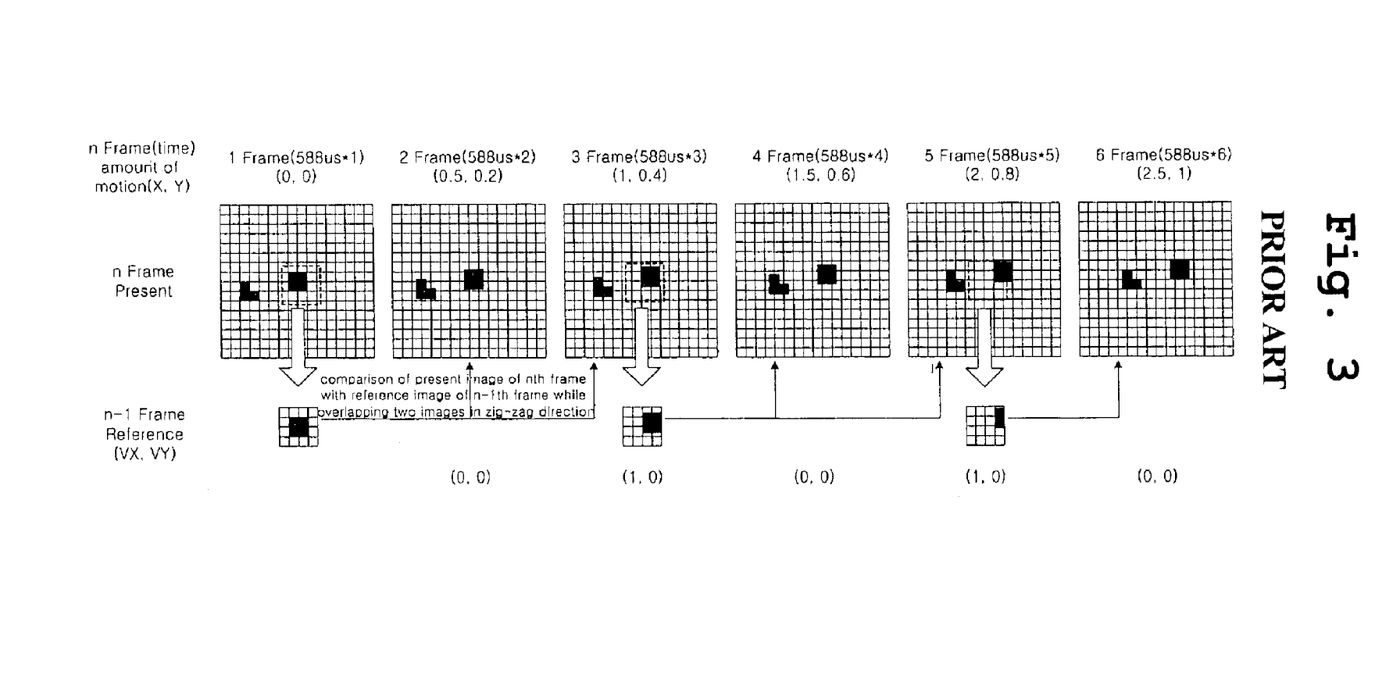
FIG. 3 is a view illustrating the optimal division of a conventional navigation engine using one channel.

FIG. 3 is a view illustrating the optimal division of a conventional navigation engine using one channel, which shows a case where a one-channel algorithm is applied. In the case of applying the one-channel algorithm, if the optical mouse moves 0.5 pixel in the X axis direction and 0.2 pixel in the Y axis direction in every frame, for example, at an interval of 588 μs, respectively, the motion of one pixel or less cannot be detected.

In this case, there is described the motion of the optical mouse ranging from a first frame to a sixth frame with reference to FIG. 3, as an example.

Referring to the motion of the optical mouse with respect to time in a present nth frame, if the amounts of motions in the X and Y axis directions are 0 and 0 in the first frame (588 μs*1), respectively, the amounts of the motions in the X and Y axis directions are 0.5 and 0.2 in the second frame (588 μs*2), respectively, the amounts of the motions in the X and Y axis directions are 1 and 0.4 in the third frame (588 μs*3), respectively, the amounts of the motions in the X and Y axis directions are 1.5 and 0.6 in the fourth frame (588 μs*4), respectively, the amounts of the motions in the X and Y axis directions are 2 and 0.8 in the fifth frame (588 μs*5), respectively, and the amounts of the motions in the X and Y axis directions are 2.5 and 1 in the sixth frame (588 μs*6), respectively. As in the above-described method, if the motion of the optical mouse occurs in an eleventh frame, the actual amounts of the motions in the X and Y axis directions are 5 and 2, respectively, but the detected amounts of the motions in the X and Y axis directions are 5 and 0, respectively.

In this case, VX and VY, which are the sum of vectors accumulated in the X axis direction and the sum of vectors accumulated in the Y axis direction, respectively, are represented as the XY coordinates (0, 0) in the second frame in the case where the optical mouse moves 0.5 pixel in the X axis direction and 0.2 pixel in the Y axis direction, compared to the motion of the first frame. The reason is that the motion of one pixel or less cannot be detected when the second frame is compared to the reference image of the n−1 th frame, for example, the first frame. Next, the VX and VY are represented as XY coordinates (1, 0) in the third frame in the case where the optical mouse moves 0.5 pixels in the X axis direction and 0.2 pixel in the Y axis direction, compared to the motion of the second frame. 0.5 pixel is accumulated in the X axis direction in each of the second and third frames from the reference image of the n−1 th frame, and the amount of the motion in the X axis direction therefore becomes 1; while 0.2 pixel is accumulated in the Y axis direction in each of the second and third frames from the reference image of the n−1 th frame, and the amount of motion in the Y axis direction therefore becomes 0.4. Accordingly, motion of one pixel or less cannot be detected, so the value of VY becomes 0. Thereafter, the reference image of the n−1 th frame is updated to the third frame because the value of the VX is changed from 0 to 1.

Accordingly, the motion in only the X axis direction can be detected when the motion of the optical mouse occurs in the eleventh frame, so the values of the VX and the VY are 5 and 0, respectively. However, the motion in the Y axis direction cannot be detected in the case where the optical mouse moves 0.2 pixel in the Y axis direction in every frame, so the value of the VY becomes 0 although the optical mouse actually moves 2 pixels in the Y axis direction.

In short, the XY coordinates of VX and VY, which are the sum of vectors accumulated in the X axis direction and the sum of vectors accumulated in the Y axis direction, respectively, are represented as (2, 0) by the calculation of (0, 0)+(1, 0)+(0, 0)+(1, 0)+(0, 0). Accordingly, although the actual amounts of the motions in the X and Y axis directions are 2.5 and 1 in the sixth frame, respectively, the value of the VY is not detected as "1". The detection error of the amount of the motion in the X axis is 0.5 by the calculation of 2.5−2 and the detection error of 0.5 is detected in the next frame, that is, a seventh frame. In the case where the motion of the optical mouse occurs in the eleventh frame, the actual amounts of the motions in the X and Y axis directions, are 5 and 2, respectively however, the detected amounts of the motions in the X and Y axis directions, are 5 and 0, respectively. That is, the motion in the X axis direction can be detected, and the motion in the Y axis direction cannot be precisely detected.

In the application of the conventional method of processing image data of the optical mouse, the two-dimensional motion of an optical mouse should be corrected.

That is, if the two-dimensional motion is calculated using a single navigation engine, for example, an algorithm for processing image data, the detection errors of the motion are increased according to conditions under which a reference image is updated. For example, if the condition is set to a case where the motion in the X axis direction or the motion in the Y axis direction is detected, the motion in the Y axis direction is not detected when the motion in the X axis direction is greater than one pixel and the motion in the Y axis direction is equal to or less than one pixel. For another case, if the condition is set to a case where the motion in the X axis direction and the motion in the Y axis direction are detected, the reference image is not updated until the motion in the X axis direction and the motion in the Y axis direction are detected at the same time, so the detection errors of the motion are increased.

Accordingly, if the two-dimensional motion of the optical mouse is calculated using the single navigation engine for processing image data of the conventional optical mouse, the detection of the small motion of one pixel or less of the optical mouse in one direction, for example, the X axis direction or Y axis direction, is actually improved, but the detection of the motion of the optical mouse in the other direction can be deteriorated.

SUMMARY OF THE INVENTION

Accordingly, the present invention has been made keeping in mind the above problems occurring in the prior art, and an object of the present invention is to provide a method of processing image data of an optical mouse, in which navigation engines are individually used to detect motions in X and Y axis directions, respectively, not but using a single navigation engine to detect two-dimensional motion, thereby improving the detection of the optical mouse in X and Y axis directions.

In order to accomplish the above object, the present invention provides a method of processing data of an optical mouse, including calculating a motion vector of the optical mouse through processing of digitally converted image pixel data in an ISP by sequentially overlapping a reference image of an n−1 th frame to a present image of an nth frame and determining a moving direction of the optical mouse using most approximately equal parts in the reference and present images; and transmitting the calculated motion vector to a personal computer through an interface; wherein the ISP includes an X axis navigation engine for processing data on a reference image for the motion of an X axis direction among the processed image pixel data and a Y axis navigation engine for processing data on a reference image for the motion of a Y axis direction among the processed image pixel data, and the X and Y axis navigation engines each store the reference image of the n−1 th frame, the present image of the nth frame, and a reference image of the nth frame.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Reference now should be made to the drawings, in which the same reference numerals are used throughout the different drawings to designate the same or similar components.

Hereinafter, there is described a preferred embodiment of the present invention with reference to the accompanying drawings.

Figure 4:
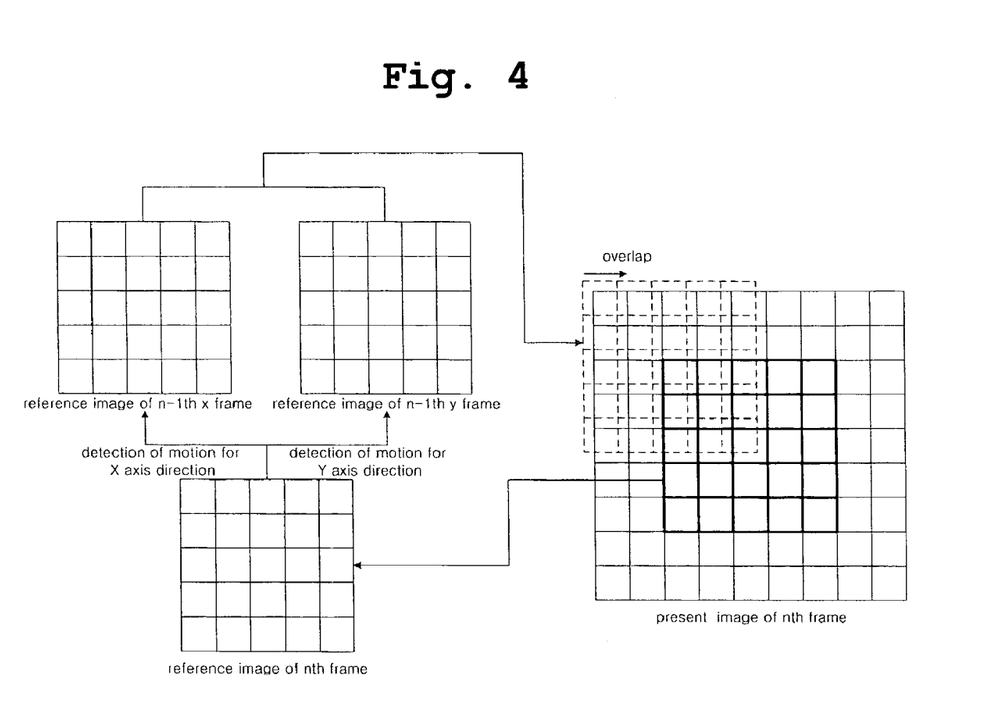
FIG. 4 illustrates the operation of an algorithm for processing image data in an optical mouse in accordance with the present invention.

FIG. 4 illustrates the operation of an algorithm for processing image data in an optical mouse in accordance with the present invention.

Figure 5:
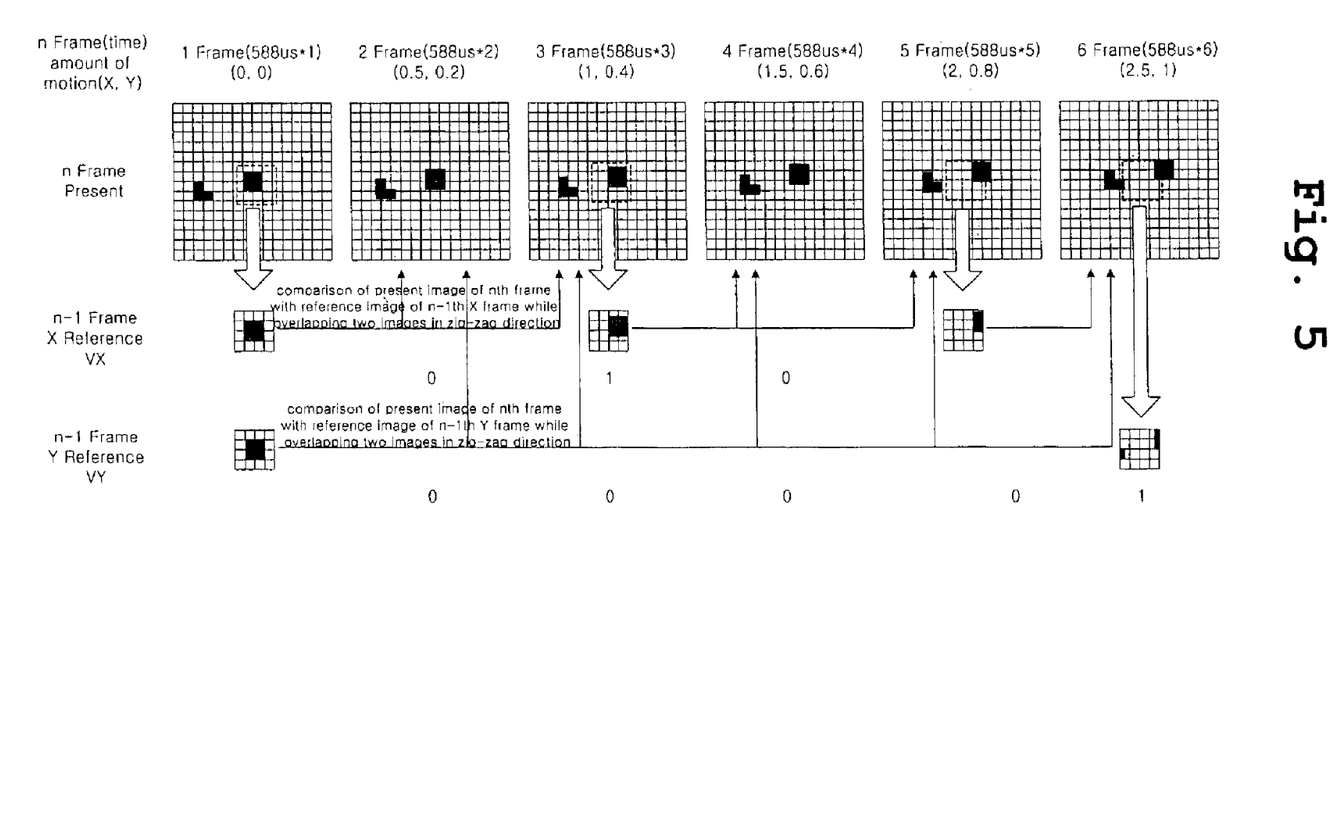
FIG. 5 illustrates the sum of vectors obtained by X and Y axis navigation engines.

In the present invention, two navigation engines for detecting motions in X and Y axis directions, respectively, are provided to minimize the detection errors of the two-dimensional motion of the optical mouse. FIG. 5 illustrates the sum of vectors obtained by X and Y axis navigation engines. Referring to FIG. 5, a motion calculated in an X axis navigation engine is represented by a vector $\vec{X}$, a motion calculated in a Y axis navigation engine is represented by a vector $\vec{Y}$, the two-dimensional motion vector $\vec{Z}$ of the optical mouse is calculated by the sum of the vectors $\vec{X}$ and $\vec{Y}$, that is, $\vec{Z} = \vec{X} + \vec{Y}$.

An advantage of the present invention is that it obtains the precise value of the two-dimensional motion vector of the optical mouse moving along a slanting line, a circle, or the like. Accordingly, a motion similar to the actual motion of the optical mouse can be found.

The concept of the division of a navigation engine can be extended to dimensions other than one dimension, for example, two dimensions or three dimensions.

Further, the preferred embodiment of the present invention can become apparent through the description of a case where the algorithm using two channels is applied. In this case, the channel is defined as a dimension, so one channel represents one direction, such as an X axis direction or Y axis direction (the one dimension), and two channels represents two directions, such as the X and Y axis directions (the two dimensions).

Figure 6:
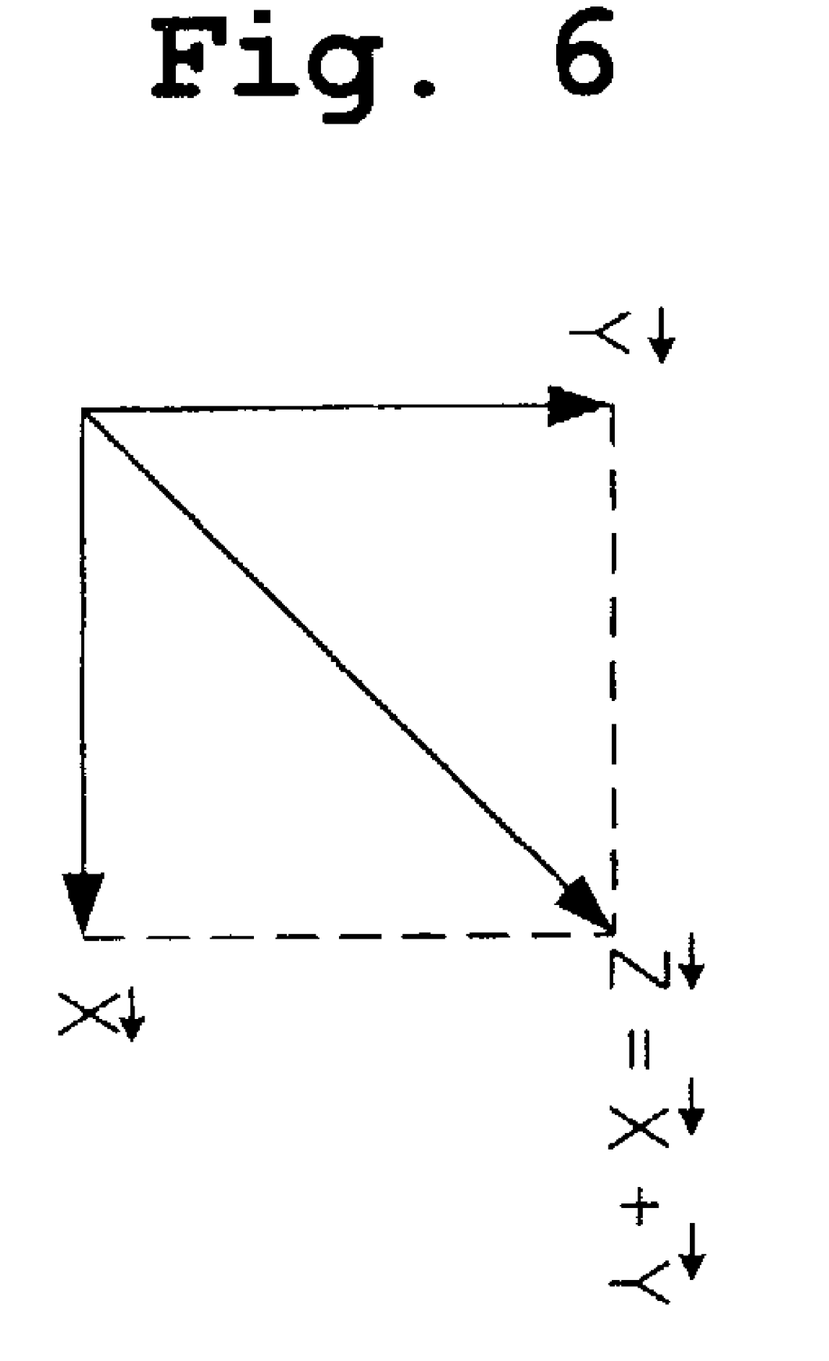
FIG. 6 is a view illustrating the optimal division of navigation engines using two channels in accordance with the present invention.

FIG. 6 is a view illustrating the optimal division of navigation engines using two channels in accordance with the present invention, which shows a case where a two-channel algorithm is applied.

In the case of applying the two-channel algorithm, if the optical mouse moves 0.5 pixel in the X axis direction and 0.2 pixel in the Y axis direction in every frame, for example, at an interval of 588 µs, respectively, the motion of one pixel or less cannot be detected, as in the one-channel algorithm.

In this case, there is described the motion of the optical mouse ranging from a first frame to a sixth frame with reference to FIG. 6, as an example.

Referring to the motion of the optical mouse with respect to time in a present nth frame, if the amounts of motions in the X and Y axis directions are 0 and 0 in the first frame (588 µs*1), respectively, the amounts of the motions in the X and Y axis directions are 0.5 and 0.2 in the second frame (588 µs*2), respectively, the amounts of the motions in the X and Y axis directions are 1 and 0.4 in the third frame (588 µs*3), respectively, the amounts of the motions in the X and Y axis directions are 1.5 and 0.6 in the fourth frame (588 µs*4), respectively, the amounts of the motions in the X and Y axis directions are 2 and 0.8 in the fifth frame (588 µs*5), respectively, and the amounts of the motions in the X and Y axis directions are 2.5 and 1 in the sixth frame (588 µs*6), respectively. As in the above-described method, the actual amounts of the motions in the X and Y axis directions are 5 and 2, respectively, if the motion of the optical mouse occurs in an eleventh frame.

In this case, the value of VX, that is, the vector $\vec{X}$, which is the sum of vectors accumulated in the X axis direction is represented as 0 in the first and second frames. The reason is that the motion of one pixel or less in the X axis direction cannot be detected in either of the first and second frames. Next, the value of the VX is represented as 1 in the third frame because the optical mouse moves one pixel in the X axis direction. Additionally, the amount of the motion in the X axis direction is determined as a certain value, not but 0, so the reference image of an n−1 th frame is updated to the reference image of the nth frame. Accordingly, if the motion of the optical mouse occurs in an eleventh frame, the value of the VX is represented as 5 because the motion in the X axis direction is only detected.

Meanwhile, the value of VY, that is, the vector $\vec{Y}$, which is the sum of vectors accumulated in the Y axis direction, is represented as 0 in the first and second frames. The reason is that motion of one pixel or less in the Y axis direction cannot be detected in either of the first and second frames. Next, the value of the VY is represented as 0 in the third frame to the fifth frame because the optical mouse moves one pixel or less in the Y axis direction. Next, the value of the VY is represented as 1 in the sixth frame because the optical mouse moves one pixel in the Y axis direction. Additionally, the reference image of the n−1 th frame is updated to the reference image of the nth frame. The above-described processes are applied to the eleventh frame.

In short, the value of the VX, which is the sum of vectors accumulated in the X axis direction, is 2 by the calculation of 0+1+0+1+0, and the value of the VY, which is the sum of the vectors accumulated in the Y axis direction, is 1 by the calculation of 0+0+0+0+1. Accordingly, the accumulated sums of the vectors VX and VY can be represented as the XY coordinates (2, 1), and the actual amounts of the motions in the X and Y axis directions are represented as the XY coordinates (2.5, 1) in the sixth frame. The detection error of the amount of the motion in the X axis is 0.5 by the calculation of 2.5−2 and the detection error of 0.5 is detected in the next frame, that is, a seventh frame. In the case where the motion of the optical mouse occurs in the eleventh frame, the actual amounts of the motions in the X and Y axis directions, are 5 and 2, respectively, and detected amounts of the motions in the X and Y axis directions, are also 5 and 2, respectively. That is, the motion in the X axis direction can be detected, and the motion in the Y axis direction cannot be precisely detected.

Figure 7:
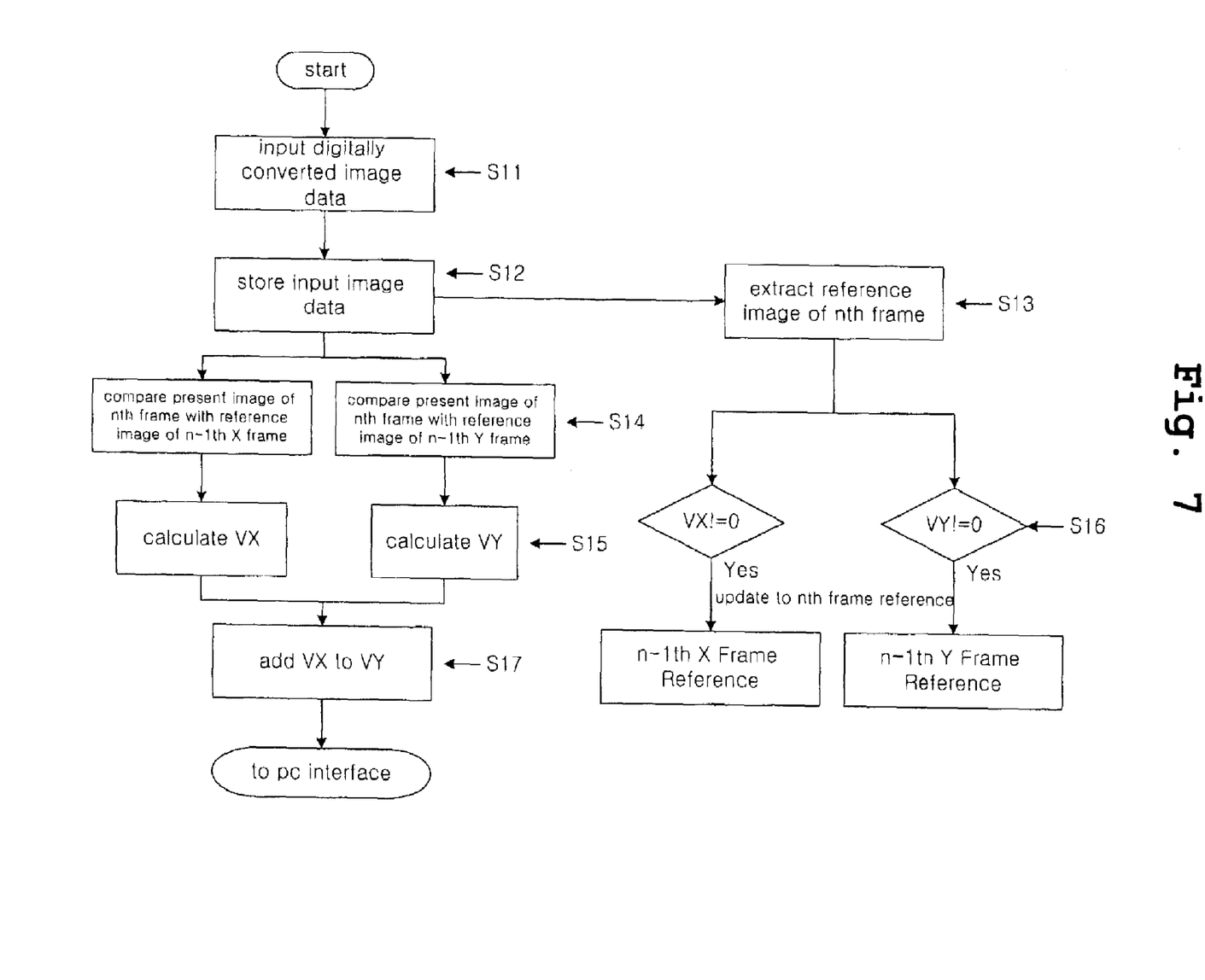
FIG. 7 is a flowchart of the algorithm for processing image data of two channels using optimally divided navigation engines.

Next, there is described the two-channel algorithm for the X and Y axis directions with reference to FIG. 7.

FIG. 7 is a flowchart of the algorithm for processing image data of two channels using optimally divided navigation engines.

Image data digitally converted from analog data detected in an image pixel array is input at step S11. The input image data is stored in the present buffer of an nth frame as the present image of the nth frame at step S12. Additionally, some images are extracted from the present buffer of the nth frame and the extracted images are stored in the reference buffer of the nth frame at step S13.

Thereafter, the stored present image of the nth frame is compared to the reference image of an n−1 th X frame, which is an n−1 th frame of the X axis direction, and the reference image of an n−1 th Y frame, which is an n−1 th frame of the Y axis direction, at step S14. Thereafter, VX, which is the vector of the X axis direction, is calculated using approximately equal parts obtained by comparing the present image of the nth frame and the reference image of the n−1 th X frame, and VY, which is the vector of the Y axis direction, is calculated using approximately equal parts by comparing the present image of the nth frame and the reference image of the n−1 th Y frame at step S15.

If the value of the calculated VX is not "0", the reference image of the n−1 th X frame is updated to the reference image of the nth frame, while if the value of the calculated VX is "0", the reference image of the n−1 th X frame is maintained; while if the value of the calculated VY is not "0", the reference image of the n−1 th Y frame is updated to the reference image of the nth frame, while if the value of the calculated VY is "0", the reference image of the n−1 th Y frame is maintained at step S16. Thereafter, a motion vector is obtained by adding the calculated vectors VX and VY at step S17.

It is preferable that the number of the reference image of the n−1 th frame is N (N=1~3), and the number of present and reference images of the nth frame is each one. N=1 means one dimension. N=2 means two dimensions. N=3 means three dimensions.

As described above, in the present invention, the motion vector is obtained by adding the vectors VX and VY calculated by independent navigation engines of the X and Y axis directions instead of one navigation engine using one channel, so the natural two-dimensional motion of the optical mouse can be represented.

As described above, the present invention, provides a method of processing image data of an optical mouse, in which image data output from the image pixel array of an integrated circuit for the optical mouse is converted into digital image data, and the motion vector is calculated by adding VX and VY obtained by the application of a navigation algorithm in each of the X and Y axis directions so as to obtain the change of the location of the image data by providing the converted digital image data to the navigation algorithm, thereby improving the detection of the two-dimensional motion of the optical mouse.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of processing data of an optical mouse, comprising: calculating a motion vector of the optical mouse through processing of digitally converted image pixel data in an Image Signal Processor (ISP) by sequentially overlapping a reference image of an n−1 th frame to a present image of an nth frame and determining the most approximately equal parts in the reference and present images as a moving direction of the optical mouse; and transmitting the calculated motion vector to a personal computer through an interface;

wherein the ISP includes an X axis navigation engine for processing data on a reference image for the motion of an X axis direction among the processed image pixel data and a Y axis navigation engine for processing data on a reference image for the motion of a Y axis direction among the processed image pixel data, and the X and Y axis navigation engines each store the reference image of the n−1 th frame, the present image of the nth frame, and a reference image of the nth frame.

2. The method according to claim 1, wherein the motion vector $\vec{Z}$ of the optical mouse is determined by adding the motion represented as $\vec{X}$ calculated by the X axis navigation engine to the motion represented as $\vec{Y}$ calculated by the Y axis navigation engine, that is, $\vec{Z}=\vec{X}+\vec{Y}$.

3. The method according to claim 1, wherein a number of the reference image of the n−1 th frame is N (N=1~3), and a number of present and reference images of the nth frame is each one.

4. The method according to claim 1, wherein the step of calculating a motion vector comprises the steps of:

storing the digitally converted image pixel data in a present buffer of the nth frame as the present image of the nth frame;

extracting some images from the present buffer of the nth frame and storing the extracted images in a reference buffer of the nth frame;

comparing the stored present image of the nth frame with the reference image of the n−1 th frame of the X axis direction and the reference image of the n−1 th frame of the Y axis direction;

calculating VX, which is a vector of the X axis direction, using approximately equal parts in the present image of the nth frame and the reference image of the n−1 th frame of the X axis direction by comparing the present and reference images, and calculating VY, which is a vector of the Y axis direction, using approximately equal parts in the present image of the nth frame and the reference image of the n−1 th frame of the Y axis direction by comparing the present and reference images; and calculating the motion vector by adding the calculated vectors VX and VY.

5. The method according to claim 4, wherein if a value of the calculated VX is not "0", the reference image of the n−1 th frame of the X axis direction is updated to the reference image of the nth frame, while if the value of the calculated VX is "0", the reference image of the n−1 th frame of the X axis direction is maintained; while if a value of the calculated VY is not "0", the reference image of the n−1 th frame of the Y axis direction is updated to the reference image of the nth frame, while if the value of the calculated VY is "0", the reference image of the n−1 th frame of the Y axis direction is maintained.

6. A method of processing digitally converted image pixel data of an Image Signal Processor (ISP) included in an optical mouse, comprising:

calculating vectors VX and VY using X axis and Y axis navigation engines for processing motions in X and Y axis directions, respectively; and calculating a motion vector of the optical mouse by adding the calculated vectors VX and VY.

7. The method according to claim 6, wherein the step of calculating the vector VX comprises;

storing the digitally converted image pixel data in a present buffer of an nth frame as a present image of an nth frame;

extracting some images from the present buffer of the nth frame and storing the extracted images in a reference buffer of the nth frame;

comparing the present image of the nth frame with a reference image of an n−1 th frame of the X axis direction; and calculating VX, which is a vector of the X axis direction, using approximately equal parts in the present and reference images by comparing the present and reference images.

8. The method according to claim 6, wherein the step of calculating the vector VY comprises;

storing the digitally converted image pixel data in a present buffer of an nth frame as a present image of an nth frame;

extracting some images from the present buffer of the nth frame and storing the extracted images in a reference buffer of the nth frame;

comparing the present image of the nth frame with a reference image of an n−1 th frame of the Y axis direction; and calculating VY, which is a vector of the Y axis direction, using approximately equal parts in the present and reference images by comparing the present and reference images.

9. A method of processing data of an optical mouse, comprising:

analyzing optical data in an Image Signal Processor (ISP) wherein the ISP includes an X axis navigation engine for processing data on a reference image for the motion of an X axis direction among the processed image pixel data and a Y axis navigation engine for processing data on a reference image for the motion of a Y axis direction among the processed image pixel data, and the X and Y axis navigation engines each store the reference image of the n−1 th frame, the present image of the nth frame, and a reference image of the nth frame;

calculating a vector VX in the X-axis direction using approximately equal parts in the present image of the nth frame and the reference image of the n−1 th frame of the X axis direction by comparing the present and reference images;

calculating a vector VY in the Y axis direction, using approximately equal parts in the present image of the nth frame and the reference image of the n−1 th frame of the Y axis direction by comparing the present and reference images;

calculating a motion vector by adding the calculated vectors VX and VY, wherein if a value of the calculated VX is not "0", the reference image of the n−1 th frame of the X axis direction is updated to the reference image of the nth frame;

wherein if the value of the calculated VX is "0", the reference image of the n−1 th frame of the X axis direction is maintained;

wherein if a value of the calculated VY is not "0", the reference image of the n−1 th frame of the Y axis direction is updated to the reference image of the nth frame;

wherein if the value of the calculated VY is "0", the reference image of the n−1 th frame of the Y axis direction is maintained; and transmitting the calculated motion vector to a personal computer through an interface.

10. The method according to claim 9, wherein a number of the reference image of the n−1 th frame is N (N=1~3), and a number of present and reference images of the nth frame is one.

11. A method of processing digitally converted image pixel data of an Image Signal Processor (ISP) included in an optical mouse, comprising:

a. calculating vectors VX and VY using X axis and Y axis navigation engines for processing motions in X and Y axis directions, respectively; and b. calculating a motion vector of the optical mouse by the steps of (1) storing the digitally converted image pixel data in a present buffer of the nth frame as the present image of the nth frame;

(2) extracting some images from the present buffer of the nth frame and storing the extracted images in a reference buffer of the nth frame;

(3) comparing the stored present image of the nth frame with the reference image of the n−1 th frame of the X axis direction and the reference image of the n−1 th frame of the Y axis direction;

(3) calculating VX, which is a vector of the X axis direction, using approximately equal parts in the present image of the nth frame and the reference image of the n−1 th frame of the X axis direction by comparing the present and reference images, and calculating VY, which is a vector of the Y axis direction, using approximately equal parts in the present image of the nth frame and the reference image of the n−1 th frame of the Y axis direction by comparing the present and reference images; and (4) calculating the motion vector by adding the calculated vectors VX and VY;

wherein if a value of the calculated VX is not "0", the reference image of the n−1 th frame of the X axis direction is updated to the reference image of the nth frame, while if the value of the calculated VX is "0", the reference image of the n−1 th frame of the X axis direction is maintained; while if a value of the calculated VY is not "0", the reference image of the n−1 th frame of the Y axis direction is updated to the reference image of the nth frame, while if the value of the calculated VY is "0", the reference image of the n−1 th frame of the Y axis direction is maintained.

12. The method according to claim 11, wherein the step of calculating the vector VX comprises;

storing the digitally converted image pixel data in a present buffer of an nth frame as a present image of an nth frame;

extracting some images from the present buffer of the nth frame and storing the extracted images in a reference buffer of the nth frame;

comparing the present image of the nth frame with a reference image of an n−1 th frame of the X axis direction; and calculating VX, which is a vector of the X axis direction, using approximately equal parts in the present and reference images by comparing the present and reference images.

13. The method according to claim 11, wherein the step of calculating the vector VY comprises;

storing the digitally converted image pixel data in a present buffer of an nth frame as a present image of an nth frame;

extracting some images from the present buffer of the nth frame and storing the extracted images in a reference buffer of the nth frame;

comparing the present image of the nth frame with a reference image of an n−1 th frame of the Y axis direction; and calculating VY, which is a vector of the Y axis direction, using approximately equal parts in the present and reference images by comparing the present and reference images.

* * * * *